United States Patent
Baxter et al.

[11] Patent Number: 5,979,866
[45] Date of Patent: *Nov. 9, 1999

[54] ELECTROMAGNETICALLY ACTUATED DISC-TYPE VALVE

[75] Inventors: Randy C. Baxter; David R. Gallup, both of Taylors; H. A. Staples, III, Greer, all of S.C.

[73] Assignee: Sagem, Inc., Greenville, S.C.

[*] Notice: This patent is subject to a terminal disclaimer.

[21] Appl. No.: 08/916,963

[22] Filed: Aug. 19, 1997

Related U.S. Application Data

[63] Continuation-in-part of application No. 08/466,472, Jun. 6, 1995, Pat. No. 5,692,723.

[51] Int. Cl.$^6$ .................................................. F16K 31/02
[52] U.S. Cl. ............................... 251/129.21; 251/129.16; 239/585.1; 137/550
[58] Field of Search ....................... 251/129.21, 129.16; 137/15, 550; 239/585.1, 585.3

[56] References Cited

U.S. PATENT DOCUMENTS

| | | |
|---|---|---|
| 4,572,436 | 2/1986 | Stettner et al. . |
| 4,655,396 | 4/1987 | Taxon et al. . |
| 4,787,418 | 11/1988 | Chute . |
| 4,807,812 | 2/1989 | Renowden et al. . |
| 4,813,610 | 3/1989 | Renowden . |
| 4,909,447 | 3/1990 | Gallup et al. . |
| 4,917,307 | 4/1990 | Baxter et al. . |
| 4,932,593 | 6/1990 | Kiracofe et al. . |
| 4,941,447 | 7/1990 | Mannhardt . |
| 4,958,773 | 9/1990 | Stettner et al. . |
| 4,958,774 | 9/1990 | Taylor . |
| 5,054,691 | 10/1991 | Huang et al. . |
| 5,080,288 | 1/1992 | Shen . |
| 5,086,980 | 2/1992 | Hickey ................................. 239/585.3 |
| 5,154,350 | 10/1992 | Ausiello et al. ...................... 239/585.3 |
| 5,340,032 | 8/1994 | Stegmaier et al. . |
| 5,348,232 | 9/1994 | Babitzka et al. . |
| 5,372,313 | 12/1994 | Chabon et al. . |
| 5,381,965 | 1/1995 | Chabon et al. . |
| 5,381,966 | 1/1995 | Gernert, II . |
| 5,417,373 | 5/1995 | Facchin ................................ 239/585.3 |
| 5,544,816 | 8/1996 | Nally et al. ......................... 251/129.21 |

FOREIGN PATENT DOCUMENTS

| | | |
|---|---|---|
| 302637A1 | 2/1989 | European Pat. Off. . |
| 399640A1 | 11/1990 | European Pat. Off. . |
| 536774A1 | 4/1993 | European Pat. Off. . |
| 583139A1 | 2/1994 | European Pat. Off. . |
| 403050378 | 3/1991 | Japan ................................ 239/585.3 |
| 2124554 | 12/1985 | United Kingdom . |
| 2144060 | 4/1986 | United Kingdom . |
| 2144201 | 10/1986 | United Kingdom . |
| 2144177 | 1/1987 | United Kingdom . |
| 2147949 | 3/1987 | United Kingdom . |
| 2190426 | 12/1989 | United Kingdom . |

OTHER PUBLICATIONS

Andrighetti & Gallup, Design–Development of The Lucas CAV Multipoint Gasoline Injector, 7 pages, Feb. 1987, Detroit, Michigan.

*Primary Examiner*—Denise L. Ferensic
*Assistant Examiner*—John Ball
*Attorney, Agent, or Firm*—Dority & Manning, P.A.

[57] ABSTRACT

An electromagnetically actuatable disc-type valve includes a pre-assembled hydraulic sub-assembly with a core member and a separately pre-assembled electrical sub-assembly with a body. The exterior surface of the core member is configured to facilitate insertion into the electrical sub-assembly and orientation relative thereto by use of a bushing. The outside diameter of the body of the valve is no more than 13.5 millimeters in the vicinity of the delivery end of the hydraulic sub-assembly. A fluid filter is disposed between a tensioning spring and a calibration slide to facilitate more accurate flow checking and leakage checking of the valve during manufacture.

17 Claims, 7 Drawing Sheets

ELECTROMAGNETICALLY ACTUATED DISC-TYPE VALVE

This is a continuation-in-part application to application Ser. No. 08/466,472 filed Jun. 6, 1995, now U.S. Pat. No. 5,692,723 which is hereby incorporated herein by this reference.

BACKGROUND OF THE INVENTION

The present invention relates to electromagnetically actuated valves and more particularly to such valves of the disc type.

In a gasoline engine, the standard fuel injector port in the air manifold has a diameter of 14 mm. Disc-type gasoline fuel injectors are known and typically involve a double working pole magnetic circuit. In order to house the structures forming the magnetic circuit and the fuel path of the conventional disc-type injector, the main body portion of the disc-type injector requires a relatively large diameter and cannot be inserted into the standard port. This limits the ability of engine designers in their designs of the air manifold and air inlet. A disc-type gasoline fuel injector is disclosed in U.S. Pat. No. 4,917,307 to Baxter et al. A hollow generally cylindrical outer body 11 formed of magnetic material surrounds a hollow flanged core member 13, also formed of magnetic material. A former 16 made of synthetic resin material surrounds core 13, and a solenoid winding 17 is wound around former 16. Body 11 defines an integral radially inwardly extending annular shoulder 18. An annulus 19 is trapped against annular shoulder 18 by means of a non-magnetic valve seat member 21, which itself is held in position by means of a tubular outlet member 15 which projects into the air inlet manifold of the gasoline engine. Seat member 21 is configured in the form of a disc, the diameter of which is equal to the internal diameter of body 11. Seat member 21 has a central orifice 22, which is surrounded by an inner annular seat element 23. A plate valve member 24 is biased by a spring 26 into contact with inner annular seat element 23, which is disposed within annulus 19. The valve is checked for flow while the tension in spring 26 against valve member 24 is set by staking the calibration slide into the position that yields the desired flow. Then the filter is inserted into the inlet 12 of the body 11. Valve member 24 has a plurality of openings 25 and is formed of magnetic material so that when winding 17 is energized, the flange 18 and core member 13 assume opposite magnetic polarity. The valve member 24 is attracted away from the seat element 21 against the biasing action of the spring 26 so that fuel can flow through the passage 14 and openings 25 to the central orifice 22. Movement of the valve member 24 towards the annular shoulder 18 is limited by a non-magnetic shim (not shown).

In valves of this type, critical dimensions such as the air gap typically are set during manufacture by grading shims or the thickness of other components. For example, non-magnetic plates may be inserted on one or both of a moving magnetic pole and a stationary magnetic pole.

One attempt at providing a fuel injector of very small size and very simple structure that can be produced at low cost is disclosed in published European patent application publication number 0 536 774 A1 to Babitzka et al. In this bucket-type injector, the body 1 houses an annular electromagnet 2 in which a tubular core 3 is disposed. The shutter member 4 is fixed to an armature 6 that can be magnetically attracted to the tubular core. The injection orifice 5 is formed in an element 8 that is configured with a flat bottom wall that is laser welded to the lower section of an annular wall 7, which is configured with two concentric sections of different diameters. The lower section 9 of the annular wall 7 has a relatively smaller diameter than an upper section 10 of the annular wall 7. A sealing ring 13 and a spacer washer 14 are disposed between the tubular core 3 and the upper section 10 of the annular wall of the annular ferromagnetic element 7 that partially houses the lower end of the core and partially houses the sealing ring. A tubular casing 15 formed of sheet metal contains the annular ferromagnetic element 7 and the tubular core, and the lower end of the casing 15 overlies at least a part of the annular wall 10 of the annular ferromagnetic element 7 and is fixed to the annular wall 10 of the annular ferromagnetic element 7 by means of a laser weld 19. A further laser weld 21 attaches the opposite end of the casing 15 to a flange 20 formed in the opposite end of the core. A magnetic circuit with a single working-pole is formed within the core 3, the armature 6, and the wall 10 of the ferromagnetic element 7. However, bucket-type injectors, while typically having a magnetic circuit with a single working-pole, are noisier and more prone to leakage than disc-type injectors.

OBJECTS AND SUMMARY OF THE INVENTION

It is a principal object of the present invention to provide an electromagnetically actuated disc-type valve having a substantially reduced moving mass and superior noise reduction and sealing performance.

It is still another principal object of the present invention to provide an electromagnetically actuated disc-type valve that does not rely on internally disposed O-rings for sealing.

It is another principal object of the present invention to provide an electromagnetically actuated disc-type valve having a substantially reduced diameter without sacrificing performance of the valve.

It also is a principal object of the present invention to provide an electromagnetically actuated disc-type valve having a reduced diameter while achieving improved performance over larger diameter valves.

It is yet a further principal object of the present invention to provide an electromagnetically actuated disc-type valve with a reduced diameter armature that is relatively thick yet avoids jamming in use.

It is a further principal object of the present invention to provide a disc-type, gasoline fuel injector having a reduced diameter to permit greater latitude to designers of the air manifold of the gasoline engine.

It is another principal object of the present invention to provide a disc-type, gasoline fuel injector having a reduced diameter that permits insertion of a greater depth of the injector into the injector port of the air manifold of the gasoline engine than is possible with conventional injectors.

It is another principal object of the present invention to provide an improved electromagnetically actuated disc-type valve having a magnetic circuit with a single working pole.

It is yet another principal object of the present invention to provide an electromagnetically actuated disc-type valve having a reduced diameter relative to conventional disc-type valves yet having a magnetic circuit with a single working pole.

It is still another principal object of the present invention to provide an electromagnetically actuated disc-type valve having a reduced diameter while lending itself to simpler construction and less expensive manufacturing techniques.

It is yet another principal object of the present invention to provide an electromagnetically actuated disc-type valve that can be fabricated with fewer machining operations.

It is yet another principal object of the present invention to provide an electromagnetically actuated disc-type valve that is configured so that during manufacture the valve can be checked for leakage, static flow rate and armature lift before adding the electrical sub-assembly.

It is still another principal object of the present invention to provide an electromagnetically actuated disc-type valve that can be calibrated for spring tension with the fluid filter already installed.

It is a further principal object of the present invention to provide an electromagnetically actuated disc-type valve having a hydraulic sub-assembly that is hermetically sealed and separate from the electrical sub-assembly of the valve.

It is yet a further principal object of the present invention to provide an electromagnetically actuated disc-type valve having a configuration that lends itself to being assembled by automated assembly operations.

Additional objects and advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claims.

To achieve the objects and in accordance with the purpose of the invention, as embodied and broadly described herein, the disc-type valve of the present invention includes a magnetic circuit with a single working pole, which is more efficient than a double working pole circuit that normally is associated with a disc-type fuel injector embodiment of a disc-type valve. In the single pole magnetic circuit of the present invention, the magnetic flux travels through the body, the body flange, the core member, the armature, and the magnetic nozzle pole, each of which being formed of magnetic material. However, a guide ring formed of non-magnetic material and having a smaller interior diameter than the interior diameter of the magnetic nozzle pole, prevents physical contact between the armature and the magnetic nozzle pole. Similarly, the lift stop member is also formed of non-magnetic material and is disposed to prevent contact between the armature and the core. The thickness of the guide ring is configured in relation to the exterior diameter of the armature, the amount of lift permitted the armature between the lift stop member and the top surface of the valve seat, and the diametrical clearance between the central opening of the guide ring and the armature, so as to preclude jamming of the armature against movement. The valve's configuration enables the diameter of the valve body to be kept below 13.5 mm.

The lift stop is welded to the nozzle pole and then welded to the core member. The combination of these welds together with welds to join the nozzle pole to the valve seat, hermetically seal the valve and prevent leakage of the fluid during operation of the valve. As known, the desired air gap between the bottom surface of the core member and the top surface of the armature needs to be precisely controlled. In the present invention, the welding of the lift stop member to the exterior surface of the core member can be performed so as to provide the direct control needed to set the air gap with the required accuracy.

The design of the present invention simplifies the assembly of the valve. The bottom surface and the intermediate interior sidewall of the nozzle pole form an intermediate chamber for receiving the guide ring. The exterior sidewalls of the nozzle pole and the valve seat at their respective delivery ends, are configured with complementary tapered sidewall surfaces so that they can be assembled by machine easily and accurately. The configuration of the valve of the present invention permits the valve to be hermetically sealed by welding. Because the welds hermetically seal the hydraulic sub-assembly of the valve, the hydraulic sub-assembly comprising the core member, the armature, the lift stop, the guide ring, the magnetic nozzle pole, and the valve seat, can be assembled separately from the electrical sub-assembly comprising the body, the coil, and the plastic jacket covering the body. The nozzle pole and the valve seat are configured so that they can be welded to one another without affecting the integrity of the seating of the armature on the sealing land of the valve seat.

Additionally, because the valve's hydraulic sub-assembly is a separately sealed unit, the hydraulic sub-assembly can be independently checked for such things as lift, leakage, and static flow rate before the hydraulic sub-assembly is added to the electrical sub-assembly.

Moreover, the valve's plastic jacket is molded around the body of the electrical sub-assembly before the hydraulic sub-assembly is combined with the electrical sub-assembly. In this way, the hydraulic sub-assembly is not subjected to the heat stresses and pressure stresses that otherwise would occur when the plastic jacket is molded to the body. By thus being shielded from such stresses, the reliability of the aforementioned testing of the hydraulic sub-assembly is maintained. In addition, since the valve's filter is inserted into the central passage of the core member before the calibration slide is inserted to set the biasing force on the armature, the flow testing of the valve can occur in the presence of the filter, thus enhancing the reliability of the flow testing of the hydraulic sub-assembly.

A top bushing connects the hydraulic sub-assembly to the electrical sub-assembly of the valve and enables the distinguishing features of the electrical sub-assembly of the valve to be oriented with respect to the distinguishing features of the hydraulic sub-assembly of the valve before the top bushing is welded into place to fix these desired orientations of the two sub-assemblies relative to one another.

The manufacture of the valve of the present invention can be accomplished with very few machining operations. This is possible because the core member can be formed of a piece of tubing, as can the body of the injector. Moreover, both the lift stop and the guide ring can be formed of a fine blanked component. Furthermore, the armature can be molded, and only a small amount of secondary machining would be required to finish the outer surfaces of the armature.

The accompanying drawings, which are incorporated in and constitute a part of this specification, illustrate one embodiment of the invention and, together with the description, serve to explain the principles of the invention.

DETAILED DESCRIPTION OF THE PREFERRED EMBODIMENTS

Reference now will be made in detail to the presently preferred embodiments of the invention, one or more examples of which are illustrated in the accompanying drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment, can be used on another embodiment to yield a still further embodiment. Thus, it is intended that the present invention cover such modifications and variations as come within the scope of the appended claims and their equivalents. The same numerals are assigned to the same components throughout the drawings and description.

Figure 1:
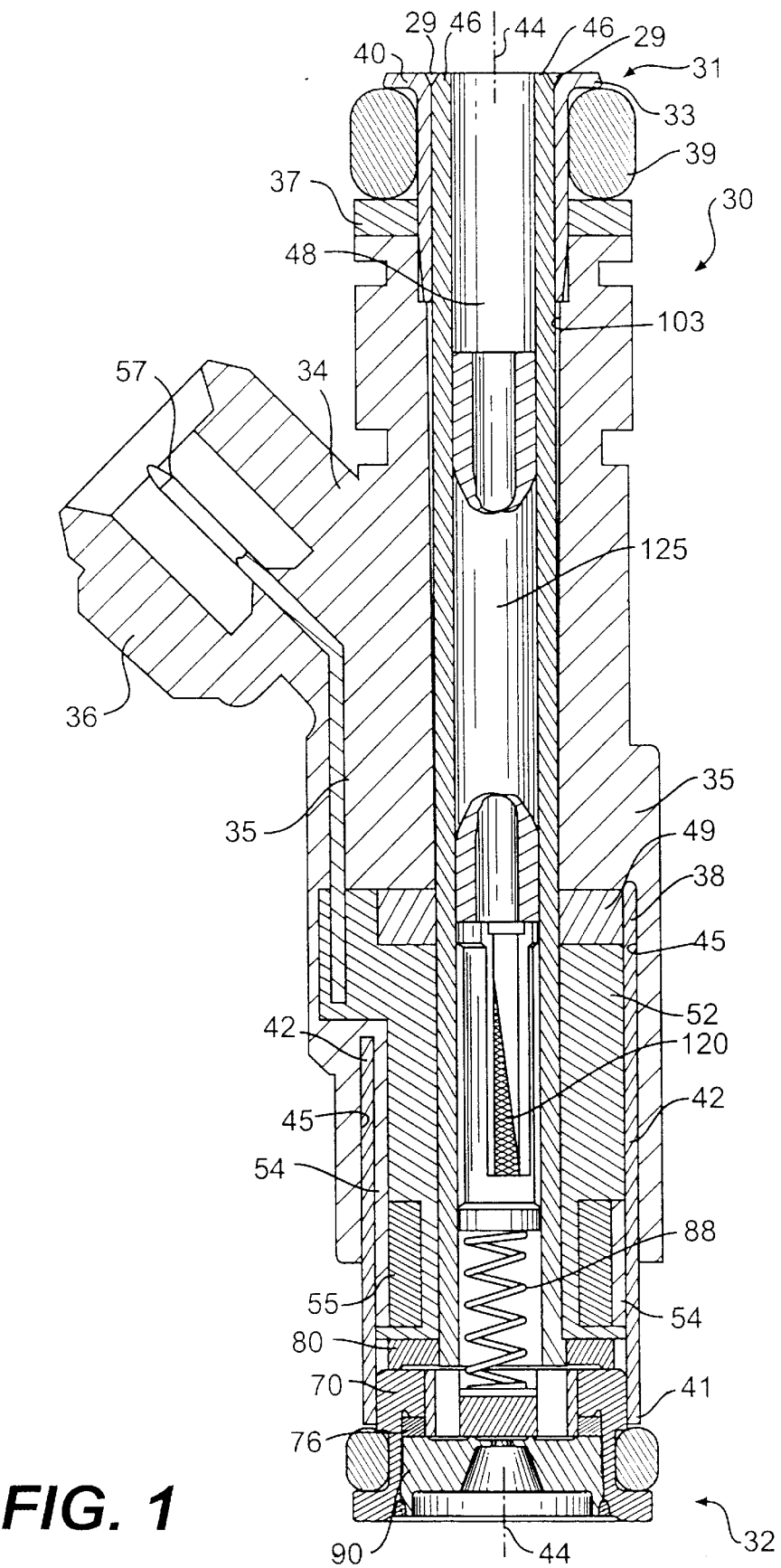
FIG. 1 is a longitudinal cross-sectional view of a preferred embodiment of assembled components of a valve in accordance with the present invention.

A preferred embodiment of the electromagnetically actuatable disc-type valve of the present invention is shown in FIG. 1 and is represented generally by the numeral 30. The valve can be used for any of a number of applications. For example, the valve can be used as a gasoline fuel injector for supplying liquid fuel to an air inlet duct of a spark ignition engine. For purposes of illustrating the structure and function of the valve of the present invention, the preferred embodiments described below and shown in the Figs. are in the form of gasoline fuel injectors.

Figure 3A:
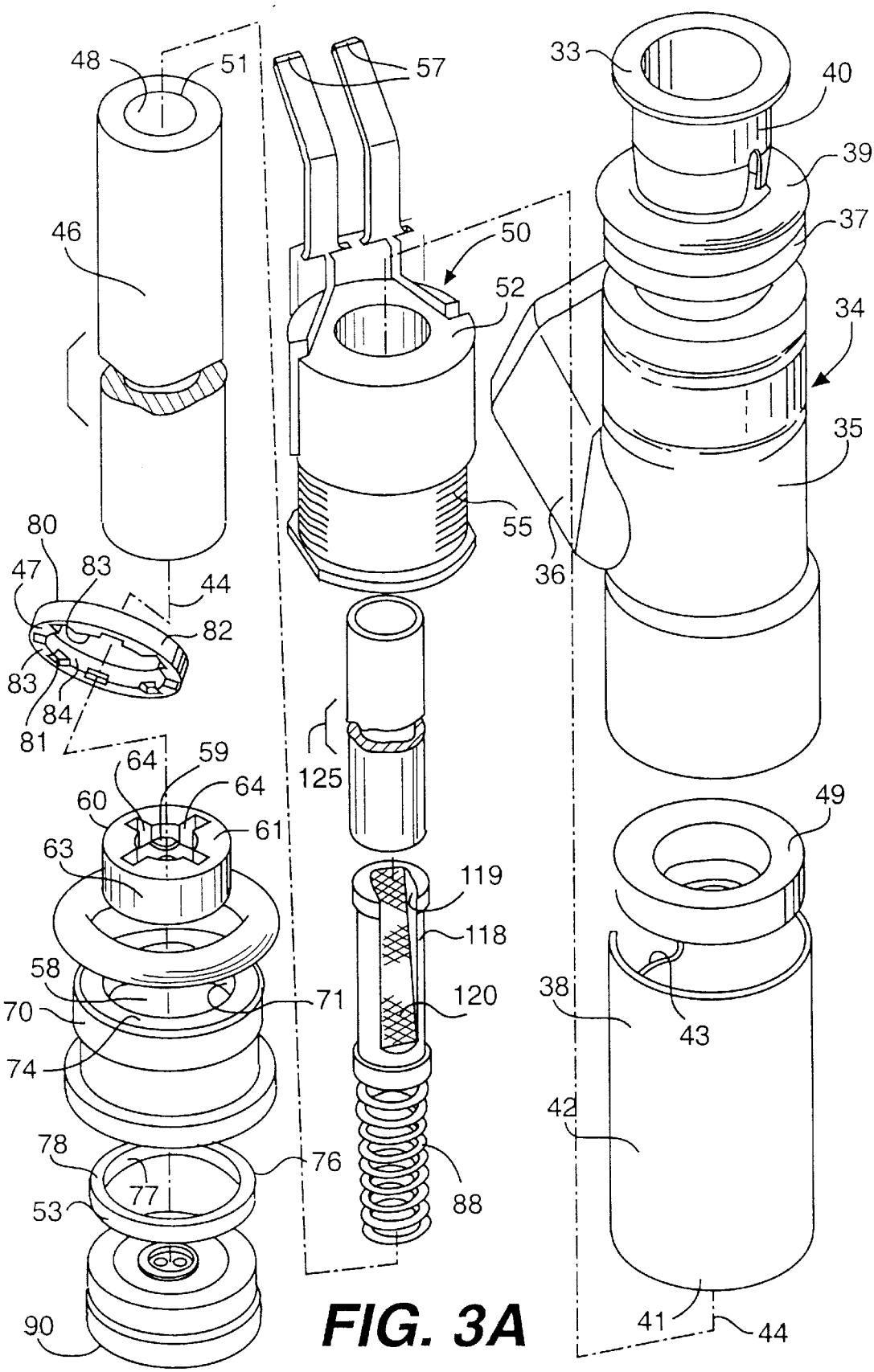
FIG. 3A is an elevated perspective assembly view of the components shown in FIG. 1.
Figure 3B:
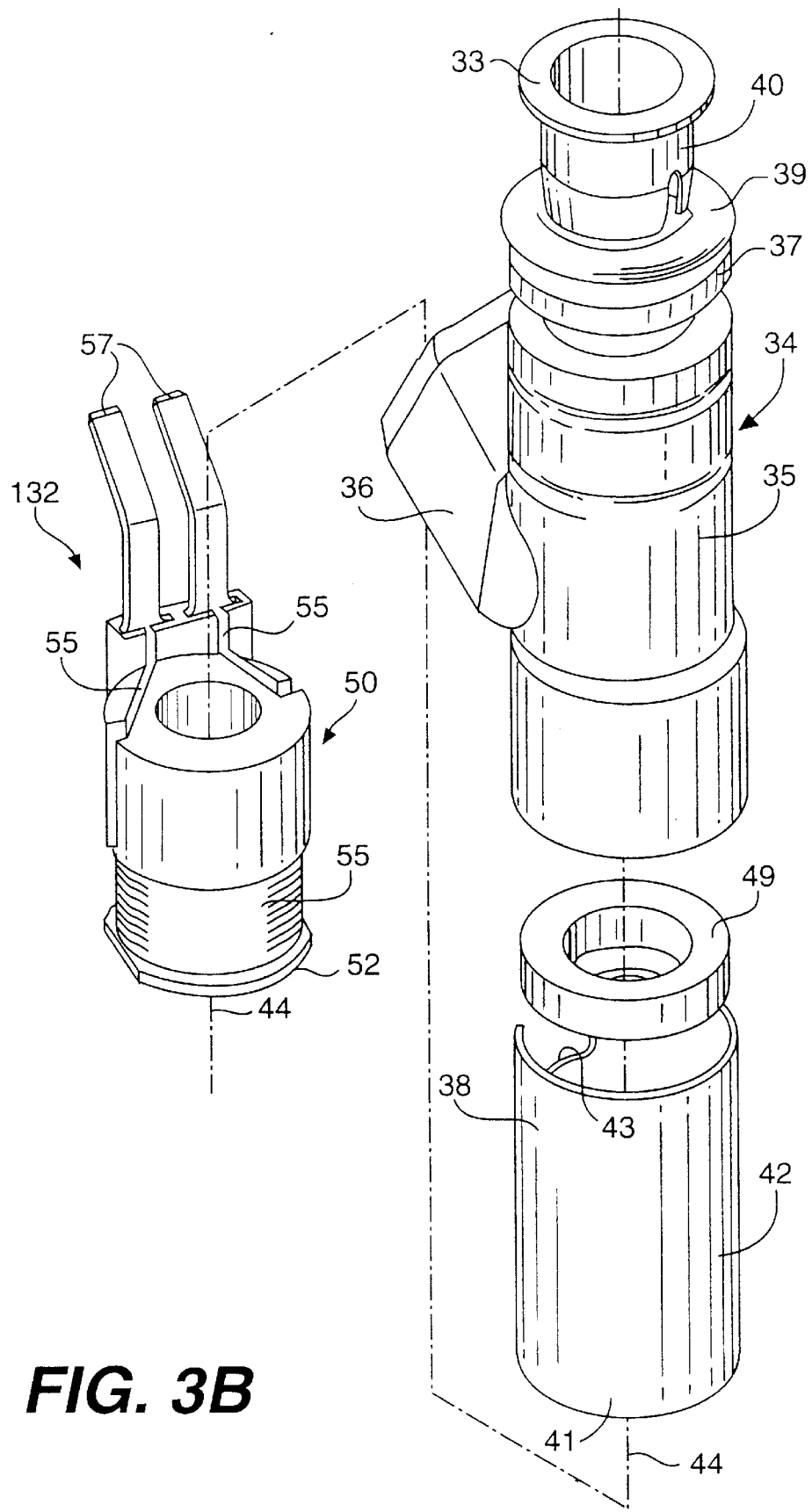
FIG. 3B is an elevated perspective assembly view of an electrical sub-assembly of components shown in FIGS. 1 and 3A.

In general, the electromagnetically actuated disc-type valve of the present invention can be regarded as having two opposite ends, a receiving end (indicated generally in FIG. 1 by the numeral 31) and a delivery end (indicated generally in FIG. 1 by the numeral 32). In the gasoline injector embodiment, the receiving end is generally disposed externally of the engine and provides connecting sites for attachment to electrical and fuel inputs for the injector. As shown in FIG. 1, the receiving end 31 of the valve 30 consists largely of a plastic jacket 34. As shown in FIGS. 3A and 3B, this plastic jacket, which is generally designated by the numeral 34, is formed by a molded plastic component having two branches, a main branch 35 and an auxiliary branch 36. The main branch 35 has two opposite ends. One end of the valve's main branch 35 houses the connection to the fluid supply for the valve and can include an O-ring 39 and a top bushing 40. Some embodiments of the valve can include a color ring 37, but it is not a necessity. However, when provided, color ring 37 is color-coded to enable easy identification of the type of valve. As shown in FIGS. 1, 3A and 3B, top bushing 40 is provided with an end flange 33 that cooperates with plastic jacket 34 or color ring 37 (when provided) to form a groove for receiving O-ring 39.

The delivery end 32 of the main branch 35 is configured to contain the components of the valve that deliver the fluid in a metered flow. In the injector embodiment, this metered flow of fuel would be delivered to the air intake (not shown) of the engine (not shown). The auxiliary branch 36 of plastic jacket 34 houses an electrical connector 57 for supplying electrical power to the wires 55 of an electrical coil assembly 50 (described below).

Figure 3C:
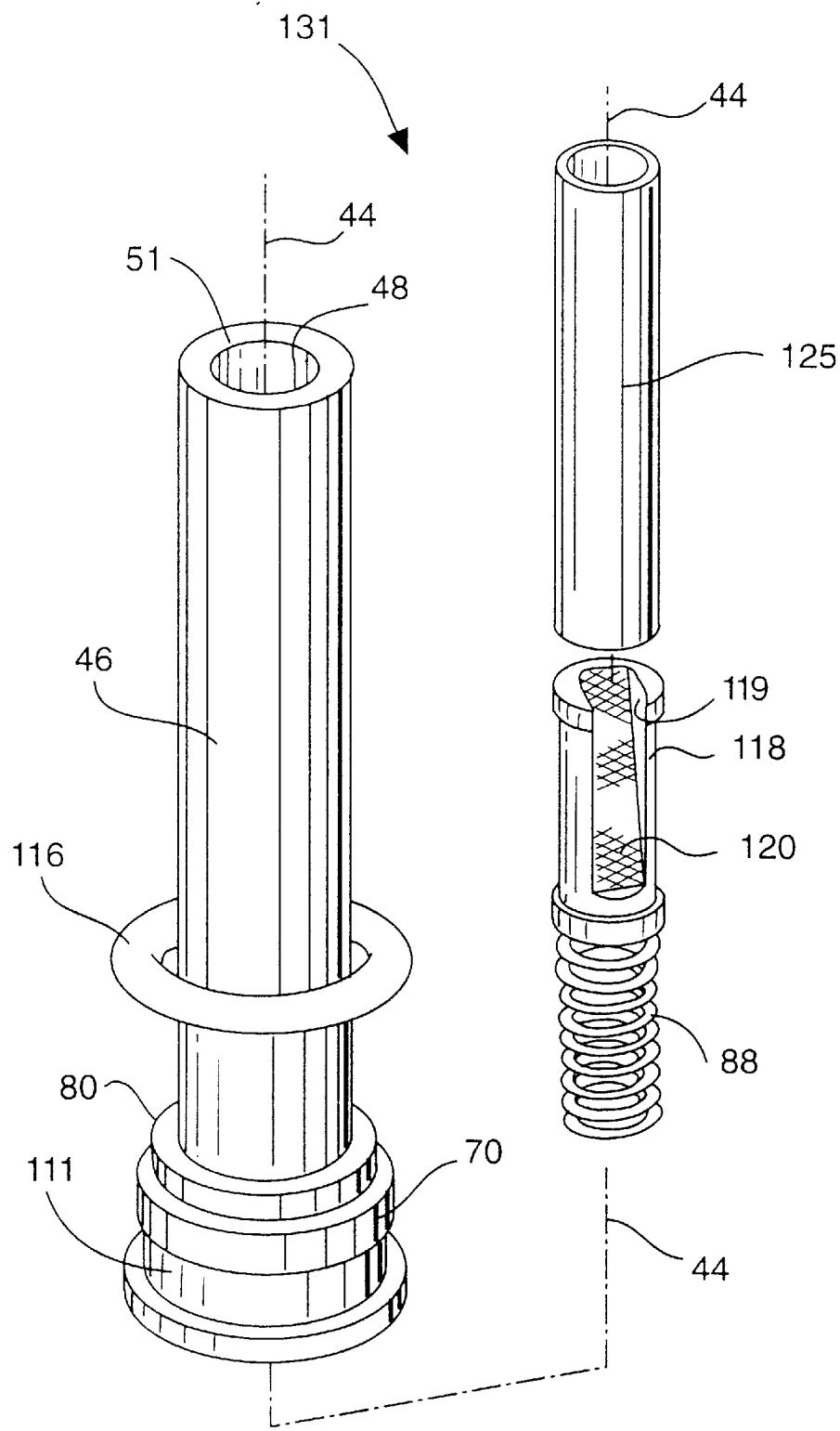
FIG. 3C is an elevated perspective assembly view of an hydraulic sub-assembly of components shown in FIGS. 1 and 3A.

In accordance with the electromagnetically actuated disc-type valve of the present invention, two distinct sub-assemblies comprise the valve. As shown in FIG. 3C for example, one sub-assembly is a hydraulic sub-assembly, which is generally designated by the numeral 131. Hydraulic sub-assembly 131 includes those components of the valve that pertain to the path taken by fluid through the valve.

As shown in FIG. 3B for example, the other sub-assembly is an electrical sub-assembly, which is indicated generally by the designating numeral 132. A first component of electrical sub-assembly 132 is provided in the form of a body 42, which is shown in FIGS. 1–3B and must be formed from magnetic material. In the gasoline fuel injector embodiment, the first external diameter of body 42 typically will not exceed 13.3 mm, which is less than the typical external diameter of the delivery end of a conventional injector.

As shown in FIGS. 3A and 3B, body 42 desirably is configured in the form of a cylindrical piece of steel tubing having a circular transverse cross-sectional shape symmetrically disposed about a central longitudinal axis 44. In other words, the exterior surface of body 42 is configured as a right cylinder with a circular transverse cross-section, and the interior surface of body 42 is configured as a right cylinder with a circular transverse cross-section. As such, the cost of manufacturing valve body 42 is minimized. An example of a suitable piece of such tubing has a first internal diameter of 11.6 mm and a first external diameter of 13.2 mm. As shown in FIG. 1, the supply end 38 of body 42 is disposed in an annular recession 45 that is formed in the interior of main branch 35 of plastic jacket 34 when plastic jacket 34 is molded around body 42. As shown in FIGS. 1 and 3A for example, body 42 has a delivery end 41 disposed opposite supply end 38 of body 42.

The electrical sub-assembly of the electromagnetically actuated disc-type valve of the present invention includes a wire wound into the form of a cylindrical hollow coil for carrying electricity to generate a magnetic field. As shown in FIGS. 3A and 3B, a coil assembly 50 is formed from metal wire 55 that is wound upon a bobbin 52 constructed of electrically insulating material. Each of the opposite ends of wire 55 is electrically connected to one of terminal blades 57, which also forms part of coil assembly 50. When the valve is in use, the ends of the coil winding are connected to a control circuit (not shown) via terminal blades 57, which are electrically connected to a cable (not shown).

As shown in FIG. 1, when the coil assembly 50 (including bobbin 52, wire 55, and terminal blades 57) is molded into plastic jacket 34, the molding process provides a region 54 of electrically insulating material that becomes disposed around wire 55 and internally of body 42. Insulating region 54 physically separates and electrically insulates wire 55 of coil assembly 50 from body 42. As shown in FIGS. 3A and 3B for example, body 42 defines a cut out 43 disposed near supply end 38 of body 42 to accommodate passage of terminal blades 57 into auxiliary branch 36 of plastic jacket 34 when plastic jacket 34 is molded around coil assembly 50.

In accordance with the present invention, the hydraulic sub-assembly of the electromagnetically actuated disc-type valve includes a core member having an exterior surface that includes a bottom surface. The core member forms the single working pole of a magnetic circuit and provides the internal passage for the fluid passing through the valve. As embodied herein and shown in FIGS. 1, 3A and 3C, a core member 46 is disposed symmetrically about central longitudinal axis 44. As shown in FIG. 1, core member 46 is disposed within body 42 and plastic jacket 34.

Core member 46 forms part of the magnetic circuit of the valve and therefore must be composed of magnetic material, desirably stainless steel tubing. An example of a suitable piece of such tubing has an internal diameter of 3.65 mm and an external diameter of 6.0 mm. Thus, as shown in FIGS. 1, 3A and 3C for example, core member 46 forms an elongated cylindrical hollow member defining an internally disposed central axial passage 48. As shown in FIGS. 3A and 3C for example, central axial passage 48 extends to a fluid inlet 51, which is connected to a source of fuel under pressure when the valve of the present invention is used as a fuel injector.

As noted above, core member 46 is a component of the valve's hydraulic sub-assembly 131, and plastic jacket 34 is a component of the valve's electrical sub-assembly 132. As shown in FIG. 1, these two sub-assemblies 131, 132 of the valve of the present invention are secured to one another in part (at the supply end of the valve) by top bushing 40, which is fixed by welds 29 to core member 46 and inserted into the supply end of plastic jacket 34. Desirably, these welds 29 are produced by a laser welder such as a neodymium doped Yttrium-Aluminum-Garnet (Nd:YAG) laser.

Figure 2:
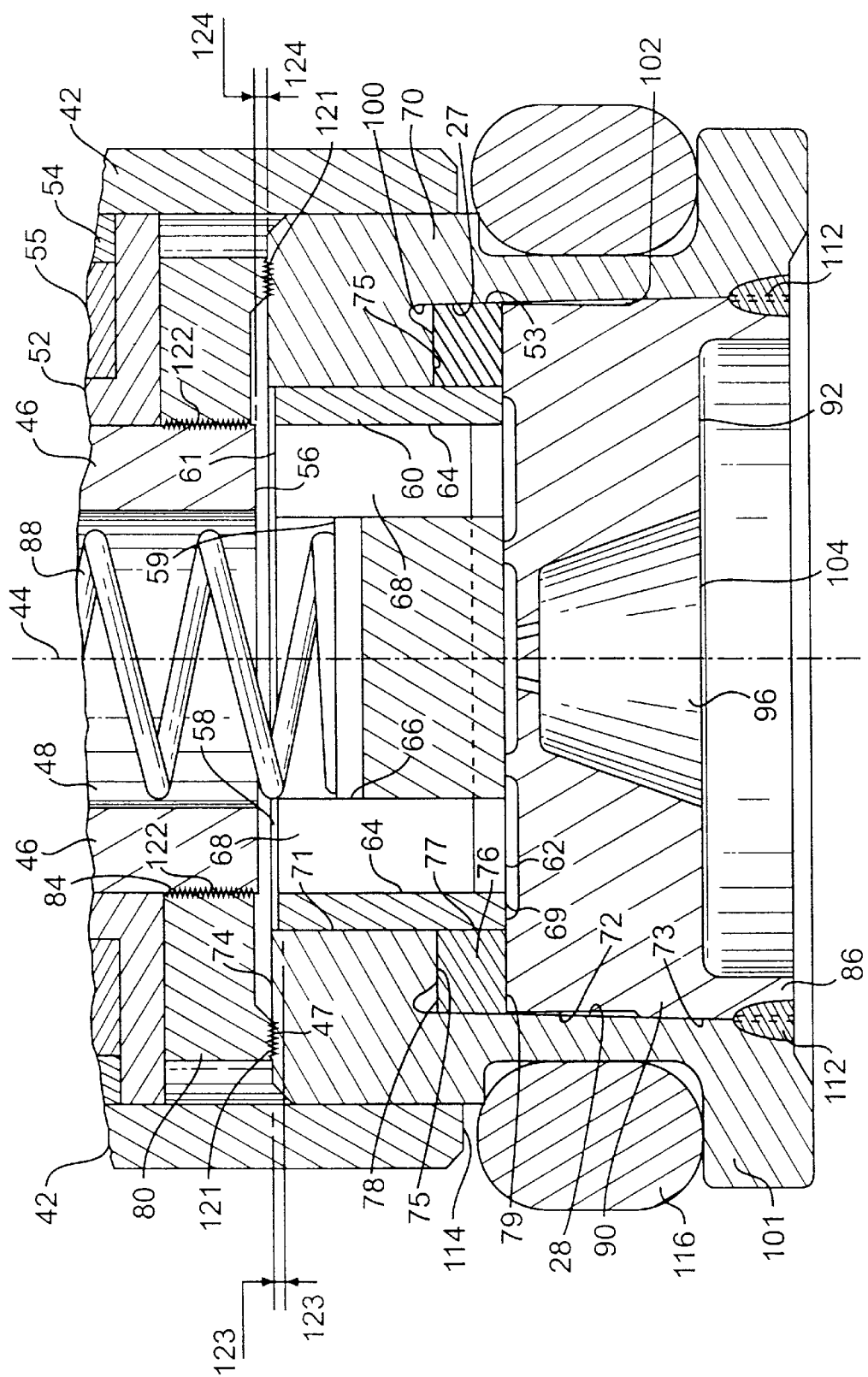
FIG. 2 is a cross-sectional view of the circled portion labeled FIG. 2 in FIG. 1 configured in a position closed to the flow of fluid.

As shown in FIG. 1, coiled wire 55 of coil assembly 50 is disposed to surround the delivery end of core member 46. As shown in FIGS. 1, 3A and 3B, a body flange 49 is provided in the form of an annular ring, which is received into jacket 34 and must be formed of magnetic material to complete the magnetic circuit between core member 46 and valve body 42 in plastic jacket 34. Body flange 49 also assists during molding in securing bobbin 52 within jacket 34. Body flange 49 is of simple construction that does not require any secondary machining. As shown in FIG. 2 for example, a bottom surface 56 of core member 46 desirably is flat. Bottom surface 56 of core member 46 forms one working pole of an electromagnet, which is selectively actuated when the control circuit provides electric power to coil assembly 50 via terminal blades 57.

In accordance with the present invention, the hydraulic sub-assembly of the valve includes another component, which is an armature having a top surface disposed toward the bottom surface of the core member. Apart from the spring (described below), the armature is the only component that moves during operation of the valve and embodies the moving mass of the valve. As shown in FIGS. 2 and 3A, an armature 60 is configured in the form of a disc with a centrally disposed axis 44 of rotation. As shown in FIG. 3A, armature 60 has a top surface 61 and is configured with a cylindrically-shaped outer side surface 63 that is disposed parallel to the centrally disposed axis 44. As shown in FIG. 2, armature 60 has a bottom surface 62 disposed to face opposite top surface 61. As shown in FIG. 2, top surface 61 of armature 60 is disposed toward bottom surface 56 of core member 46. As shown in FIG. 3A, outer side surface 63 extends axially from top surface 61 to bottom surface 62. The axial thickness of outer side surface 63 is measured by a straight side depth dimension. As shown in FIG. 3A, armature 60 also has a circumferential dimension which is defined by the diameter of armature 60. In a presently preferred embodiment, the straight side depth dimension of armature 60 desirably measures 3.0 mm, and the diameter of armature 60 desirably measures 7.2 mm.

Desirably, armature 60 can be molded from magnetic material such as three percent silicon iron in a manner so that only a small amount of secondary machining is required to finish the exterior surfaces 61, 62, 63 of armature 60. Magnetic stainless steel also could be used to form armature 60. The provision of a straight side surface 63 in armature 60 eliminates the need for machining that might be required to produce a spherical side surface.

As shown in FIGS. 2 and 3A, armature 60 has at least one fluid passage 64 extending generally axially through armature 60. As shown in FIG. 2, armature 60 is configured with a plenum 66, which is generally disposed centrally of armature 60 and that communicates with at least one fluid passage 64 via at least one conduit 68. Desirably, armature 60 has a plurality of fluid passages 64, four being shown in FIG. 3A for example. Each fluid passage 64 is configured and disposed to receive fluid from plenum 66 via a corresponding conduit 68. In a presently preferred fuel injector embodiment, each fluid passage 64 has a cross-sectional area (measured in a plane disposed perpendicular to axis 44) of 0.96 mm$^2$, each conduit 68 has a cross-sectional area (measured in a plane disposed parallel to axis 44) of 1.2 mm$^2$, the diameter (measured in a plane disposed perpendicular to axis 44) of plenum 66 is 3.4 mm, and the axial depth (measured in a plane disposed parallel to axis 44) of plenum 66 is 1.0 mm.

As shown in FIGS. 2 and 3A for example, the peripheral bottom portion of plenum 66 serves as a spring pocket and thus is configured to receive and support the tensioning spring 88 (described below) of the valve. In the embodiment shown in FIG. 3A, the spring pocket includes at least one spring seat 59, and the spring 88 will be disposed to rest against spring seat 59. Four identical spring seats 59 are symmetrically disposed around the inner periphery of plenum 66 shown in the Figs.

In accordance with the present invention, the hydraulic sub-assembly of the valve includes a yet another component, which is a magnetic nozzle pole configured in the form of an annular sleeve and disposed to surround the armature and define another part of the magnetic circuit. The magnetic nozzle pole must be formed of a magnetic material, desirably magnetic stainless steel. As embodied herein and shown in FIGS. 2 and 3A for example, an annular magnetic nozzle pole 70 has a top surface 74. As shown in FIGS. 1, 2, 3A and 3C, magnetic nozzle pole 70 has a supply end disposed partially within body 42. As shown in FIG. 2 for example, the supply end of magnetic nozzle pole 70 has a bottom surface 75 disposed opposite to top surface 74.

As shown in FIG. 3A, an interior wall 71 disposed at the supply end of nozzle pole 70 defines a centrally disposed internal opening having an interior diameter and forming the supply portion 58 of a receiving compartment (described more fully below), which has a circular transverse cross-section (taken in a plane disposed perpendicular to axis 44) defined by an interior diameter. Most of armature 60 is disposed within supply portion 58 of the receiving compartment. Interior wall 71 of the supply end of magnetic nozzle pole 70 has a cylindrically-shaped interior surface that is parallel to central axis 44. In a presently preferred embodiment shown in FIG. 2 for example, the interior diameter of supply portion 58 of the receiving compartment of magnetic nozzle pole 70 measures 7.315 mm, and the magnetic nozzle pole's exterior diameter at the supply end measures 9.19 mm. In a presently preferred embodiment, the straight side depth dimension (measured parallel to axis 44) of interior wall 71 of the supply end of magnetic nozzle pole 70 measures 2.5 mm and is also known as the axial thickness of the supply end of magnetic nozzle pole 70.

In accordance with the present invention, the hydraulic sub-assembly of the valve includes still another component, which is a guide ring configured in the form of an annular ring. The guide ring is formed of non-magnetic material such as non-magnetic stainless steel and is configured and disposed to prevent physical contact between the armature and the magnetic nozzle pole. In particular, such physical contact is prevented when the core member is energized so that the armature, the magnetic nozzle pole and the core member form part of a magnetic circuit.

As embodied herein and shown in FIG. 3A, a guide ring 76 is configured in the form of an annular ring and has a top surface 78 and a bottom surface 79 opposed to top surface 78. Guide ring 76 has a centrally disposed opening defined by an interior wall 77. The axial length of interior wall 77 defines the thickness of guide ring 76 along the axial direction, and in the embodiment shown measures 0.55 mm and extends from top surface 78 to bottom surface 79. Guide ring 76 can desirably be formed of a fine blanked component having an internal diameter of 7.215 mm and an external diameter of 9.19 mm. As shown in FIG. 2 for example, top surface 78 of guide ring 76 is disposed to contact and rest beneath a bottom surface 75 of magnetic nozzle pole 70.

As shown in FIG. 2, the opening defined by interior wall 77 is coaxial with the opening defined by interior wall 71 disposed at the supply end of nozzle pole 70. These two openings cooperate to form a receiving compartment in which armature 60 is disposed. The thickness of guide ring 76 desirably is configured in relation to the exterior diameter of armature 60, the amount of lift permitted the armature 60, and the diametrical clearance between the interior wall 77 of guide ring 76 and the armature 60 so as to preclude jamming of the armature 60 that otherwise might prevent armature 60 from moving axially.

While the armature of the valve of the present invention is thicker than the normal thickness of an armature in a conventional electromagnetically actuated disc-type valve, the armature of the present invention is centered by a very thin guide ring. Moreover, the guide ring is positioned to guide the armature by contacting the portion of the armature disposed farthest away from the attractive magnetic nozzle pole formed by core member 46 when coil assembly 50 is supplied with electric current. While the armature may tilt as it lifts toward bottom surface 56 of core member 46, the maximum tilt of the armature is determined in part by the armature's external diameter and the maximum lift distance of the armature. In addition, several parameters are chosen so as to constrain the maximum tilt of the armature such that the armature cannot jam when undergoing maximum tilting. These parameters are the axial thickness of the guide ring 76, the diametrical clearance between the interior wall 77 of guide ring 76 and the outer side surface 63 of armature 60, and the diametrical clearance between the interior wall 71 of supply end of magnetic nozzle pole 70 and the outer side surface 63 of armature 60.

As embodied herein and shown in FIGS. 1, 2, and 3A, guide ring 76 centers armature 60. As shown in FIG. 2 in particular, the interior diameter defined by interior wall 77 of guide ring 76 is close to the exterior diameter of armature 60 and smaller than the interior diameter of the supply end of magnetic nozzle pole 70. These clearances help prevent physical contact between armature 60 and magnetic nozzle pole 70. Similarly, the axial thickness, of guide ring 76 is sized in relation to the axial thickness of the supply end of magnetic nozzle pole 70 and the axial thickness of armature 60 so that when armature 60 is attracted toward bottom surface 56 of core member 46 and makes its closest approach thereto, armature 60 cannot tilt sufficiently to contact magnetic nozzle pole 70 or to jam and fail to move in response to the application of magnetic force. Thus, each of guide ring 76, magnetic nozzle pole 70, and armature 60 is configured and disposed to prevent physical contact between armature 60 and magnetic nozzle pole 70 when core member 46, armature 60, and magnetic nozzle pole 70 are disposed to form a magnetic circuit with a single working pole. Similarly, each of guide ring 76, magnetic nozzle pole 70 and armature 60 is configured and disposed to prevent armature 60 from jamming even when armature 60 is maximally tilted.

In accordance with the present invention, the hydraulic sub-assembly of the valve includes still another component, which is a lift stop member configured in the form of another annular sleeve. The lift stop member is configured and disposed to form the interface between an electrical sub-assembly of the valve and an hydraulic sub-assembly of the valve. The lift stop member also is configured and disposed to block the armature from making metal-to-metal contact with the magnetic pole formed by the bottom surface of the core member when the coil is electrified.

As embodied herein and shown in FIGS. 1, 2, 3A and 3C, a lift stop member 80 desirably is configured in the form of an annular sleeve. As shown in FIG. 3A, lift stop member 80 has a partially castellated lower surface consisting of a repeated pattern of radially extending gaps 81 that do not extend to or communicate with, the exterior side surface 82 of lift stop member 80. Thus, gaps 81 terminate radially short of the exterior side surface 82 of lift stop member 80. In FIG. 3A, lift stop member 80 is turned into a view that permits viewing of gaps 81 and interspersed ribs 83. Gaps 81 are provided to reduce the contact that armature 60 makes with lift stop member 80 and to reduce pumping losses as the armature 60 moves in the vicinity of the lift stop member 80.

As shown in FIG. 3A, lift stop member 80 has a centrally disposed axial opening defined by an interior side wall 84 and configured to receive the delivery end portion of core member 46 therein. As shown in FIG. 2, the interior diameter of interior side wall 84 of lift stop 80 is slightly larger than the exterior diameter of core member 46. Lift stop member 80 is formed of non-magnetic material such as non-magnetic stainless steel. As shown in FIG. 2, lift stop member 80 is configured and disposed to prevent physical contact between armature 60 and bottom surface 56 of core member 46. This is especially true when coil assembly 50 is selectively electrically actuated so that core member 46, armature 60, and magnetic nozzle pole 70 form part of a magnetic circuit with core member 46 forming a single working pole when coil is electrically actuated. In a presently preferred embodiment, lift stop member 80 has an interior diameter of slightly more than 6.0 mm and an exterior diameter of 9.19 mm.

In accordance with the present invention, the hydraulic sub-assembly of the valve includes yet another component, which is a valve seat. One end of the valve seat is configured with an interior surface forming a receiving chamber disposed to face toward the bottom surface of the armature. The opposite end of the valve seat defines an exit opening that is configured and disposed in communication with the receiving chamber. As embodied herein and shown in FIGS. 2 and 4–6 for example, a valve seat 90 is provided in the form of a disc-shaped member that is disposed at the delivery end 32 (FIG. 1) of the valve. As shown in FIGS. 2 and 5, valve seat 90 includes an axially extending external flange 86 that is disposed about the periphery of the delivery end of valve seat 90. As embodied herein and shown in FIGS. 2 and 4 for example, valve seat 90 has a top face (generally designated by the number 91 in FIGS. 4, 6 and 6A) that is configured to be disposed toward bottom surface 62 of armature 60. As shown in FIG. 6A for example, top face 91 of valve seat 90 defines an interior surface 94 forming a centrally disposed receiving chamber that is configured to receive fluid flowing through fluid passages 64 of armature 60.

Figure 4:
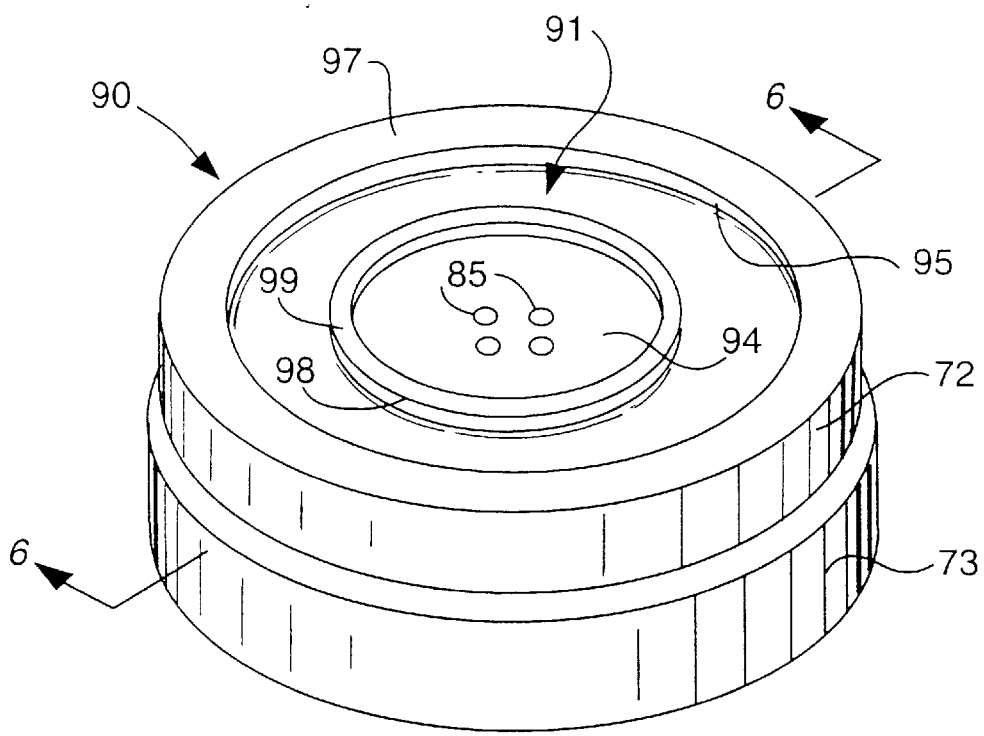
FIG. 4 is an elevated perspective top view of an embodiment of the armature component of the valve shown in FIG. 1.
Figure 5:
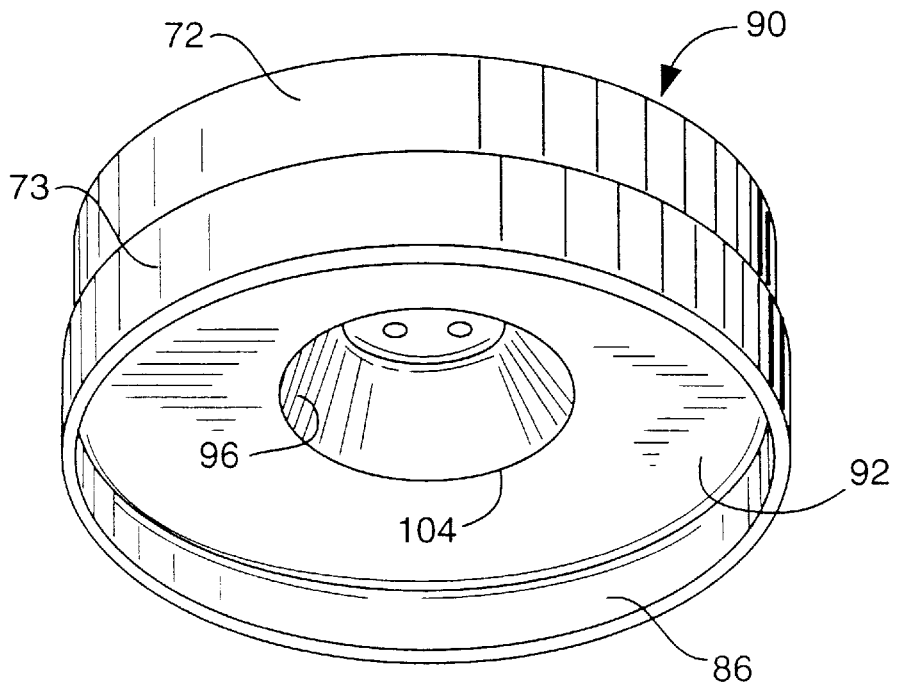
FIG. 5 is an elevated perspective bottom view of the embodiment of the armature component shown in FIG. 4.

As shown in FIGS. 4 and 6A for example, at least one entrance opening 85 is formed through interior surface 94. As shown in FIG. 6A, entrance opening 85 communicates with an exit conduit 87 that is configured to extend generally axially through valve seat 90 and terminate in an exit opening 89. As shown in FIGS. 2, 5, 6 and 6A for example, each entrance opening 85 communicates with a spray chamber defined by a conically shaped sidewall 96. Moreover, each exit conduit 87 forms a straight tube that has sidewalls configured to extend at the same angle relative to the axis 44 as sidewall 96 of the spray chamber of valve seat 90. In the embodiment shown in the Figs., four sets of entrance openings 85, exit conduits 87, and exit openings 89 are symmetrically disposed through valve seat 90.

As shown in FIGS. 4 and 6A for example, a so-called sealing land 98 is provided on the valve seat's top face 91 and has an upper surface 99 raised above top surface 94 of valve seat 90. As shown in FIG. 2 for example, sealing land 98 is disposed toward bottom surface 62 of armature 60. At least one so-called sealing land 98 desirably is provided to surround the entrances to all of the paths that would permit fluid to flow through valve seat 90. As shown in FIG. 6A for example, the paths that would permit fluid to flow through valve seat 90 would include entrance openings 85, exit conduits 87, and exit openings 89. As shown in FIG. 2, sealing land 98 is disposed to surround interior surface of top face 91 of valve seat 90 and block access to entrance openings 85 from fluid passages 64 of armature 60 when bottom surface 62 of armature 60 is resting atop upper surface 99 of sealing land 98.

Figure 6:
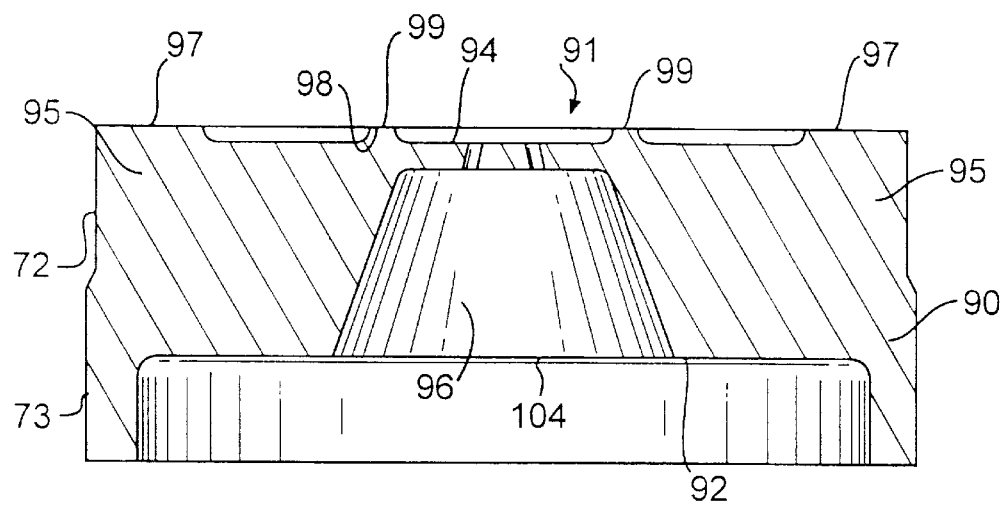
FIG. 6 is a cross-sectional view of the embodiment of the valve seat component shown in FIGS. 4 and 5 taken in the direction in which arrows 6—6 point in FIG. 4.
Figure 6A:
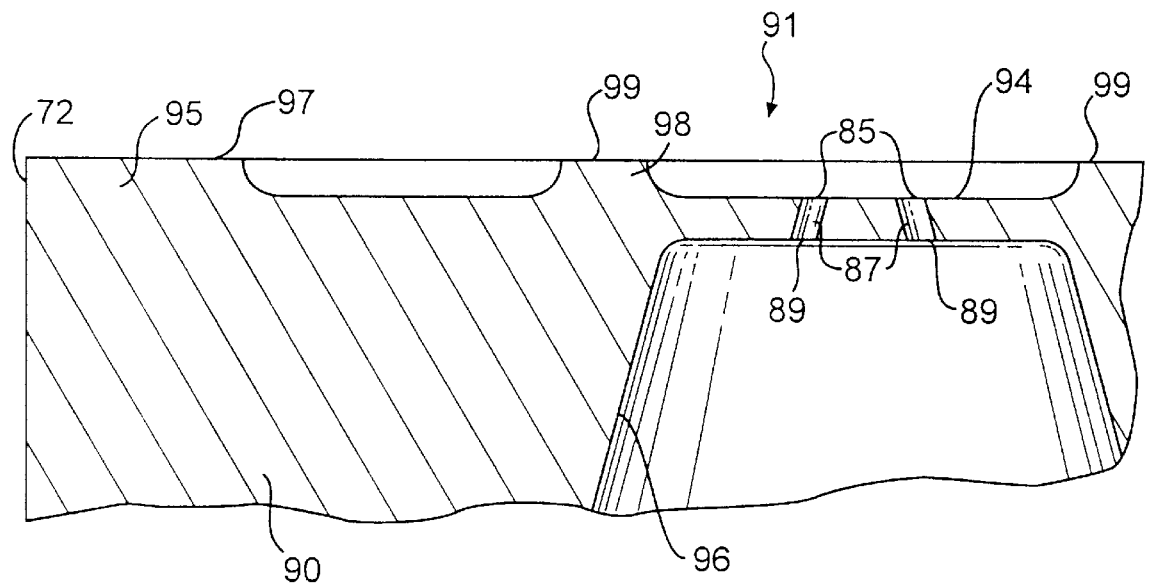
FIG. 6A is an enlarged partial cross-sectional view of the embodiment of the valve seat component shown in FIG. 6.

As shown in FIGS. 6 and 6A for example, top face 91 of valve seat 90 also includes a so-called support land 95 having a support surface 97 raised above top surface 94. As shown in FIG. 2 for example, support surface 97 of support land 95 of valve seat 90 is configured to support and receive the peripheral portion 69 of bottom surface 62 of armature 60. As shown in FIG. 6A for example, sealing land 98 and support land 95 desirably form a unitary structure with valve seat 90. In embodiments where bottom surface 62 of armature 60 is flat, support surface 97 of support land lies in the same flat plane as upper surface 99 of sealing land 98 of valve seat 90.

In accordance with the present invention, the hydraulic sub-assembly of the valve includes a means for biasing the bottom surface of the armature against the sealing land of the valve seat. Desirably, this biasing means is at least partly disposed internally of the central fluid passage of the core member. As embodied herein and shown in FIG. 2 for example, the biasing means can be provided by a coiled compression spring 88. A forward end of spring 88 is received in plenum 66 of armature 60 and rests against a spring seat 59 of armature 60. As shown in FIG. 2 for example, armature 60 is biased into contact with support surface 97 of support land 95 and upper surface 99 of sealing land 98 of valve seat 90 by means of spring 88. Thus, spring 88 provides a means of resiliently biasing bottom surface 62 of armature 60 against the respective opposed surfaces of sealing land 98 and support land 95 of valve seat 90. As shown in FIG. 2, each end of spring 88 is closed on itself and machined in a flat plane.

Accordingly, it is important that support surface 97 of support land 95 of valve seat 90 is configured to support and receive the peripheral portion 69 of bottom surface 62 of armature 60. Otherwise, the repeated downward movements of armature 60 would be stopped solely by contact with upper surface 99 of sealing land 98 and result in excessive wear of sealing land 98 and consequently poor sealing performance of the valve. The support surface 97 of support land 95 and the upper surface 99 of sealing land 98 of top face 91 of valve seat 90 permit the top face 91 of valve seat 90 to cooperate with bottom surface 62 of armature 60 to seal off the flow of fluid through the valve of the present invention.

As shown in FIG. 2 for example, valve seat 90 is symmetrically disposed about a central longitudinal axis 44. As shown in FIGS. 4–6, the circumferential exterior sidewall of valve seat 90 is stepped in two sections. The supply section of the circumferential exterior sidewall of valve seat 90 is defined by a sidewall section 72 having a cylindrical shape defining a first diameter. Sidewall section 72 is a straight side that is parallel to central axis 44. The delivery section of the circumferential exterior sidewall of valve seat 90 is defined by a sidewall section 73 having a frustroconical cylindrical shape. A stepped surface 93 connects sidewall section 72 to sidewall section 73. Sidewall section 73 is disposed to extend generally axially at an angle of about 2.5 degrees relative to central axis 44 such that the diameter of sidewall section 73 gradually increases as one proceeds away from stepped surface 93. Thus, the diameter at any point along sidewall section 73 is always larger than the first diameter of sidewall section 72. In other words, the delivery end of valve seat 90 defines a generally axially extending exterior surface 73 that is diverging to a second diameter that is larger than the first diameter of sidewall section 72 of the supply end of nozzle pole 70. Viewed from the extreme delivery end of valve seat 90, sidewall section 73 can be said to taper toward the first diameter of sidewall section 72. The stepped configuration of the circumferential exterior sidewall of valve seat 90 provides greater ease of assembling valve seat 90 into the hydraulic assembly 131 and welding valve seat 90 to nozzle pole 70, thereby reducing the cost to produce the valve.

As shown in FIG. 6 for example, valve seat 90 has a bottom surface 92 disposed to face opposite top surface 94. Truncated conically shaped interior sidewall 96 of valve seat 90 is configured in somewhat of a bell-shape and is disposed to have the wider diameter end form a circular exit opening 104 that opens through bottom surface 92 in the fuel injector embodiment shown. However, other configurations for the exit opening 104 of valve seat 90 can be used, and thus the transverse cross-sectional shape of this exit opening 104 can be other than circular. Moreover, as shown in FIGS. 2 and 6A for example, exit opening 104 is disposed in communication with conduits 87 and entrance openings 85. Together, exit opening 104, conduits 87 and entrance openings 85 provide valve seat 90 with at least one hole extending completely through valve seat 90 generally in the direction of axis 44.

As shown in FIG. 2, nozzle pole 70 has a cylindrically-shaped intermediate interior sidewall 27 that extends from bottom surface 75 for a length that is sufficient to accommodate the axial thickness of guide ring 76. Thus, intermediate interior sidewall 27 defines an intermediate internal receiving compartment 100 for receiving guide ring 76, which surrounds part of armature 60 internally of guide ring 76.

As shown in FIG. 2, nozzle pole 70 has a third interior sidewall 28 that forms a so-called delivery end sidewall 28, which extends from intermediate interior sidewall 27 to the free end of the delivery end of nozzle pole 70. Delivery end interior sidewall 28 defines a surface shaped in a frustro-conical manner and extending at an angle of about 2.5degrees relative to central axis 44 so as to mirror the angle of exterior sidewall section 73 of delivery end of valve seat 90. As shown in FIG. 2, the internal diameter defined by delivery end sidewall 28 of nozzle pole 70 in the vicinity of the delivery end of nozzle pole 70, is slightly larger than the largest diameter of exterior sidewall section 73 of valve seat 90. Moreover, the internal diameter defined by delivery end sidewall 28 in the vicinity where deliver end sidewall 28 joins intermediate interior sidewall 27 of nozzle pole 70, is slightly larger than each of the diameter of exterior sidewall section 72 of valve seat 90 and the diameter of exterior sidewall 53 of guide ring 76. Thus, the receiving chamber 102 defined by delivery end sidewall 28 at the delivery end of nozzle pole 70 houses valve seat 90. In a presently preferred embodiment, delivery end sidewall 28 of nozzle pole 70 has a maximum interior diameter of slightly more than 9.2 mm in the vicinity of the delivery end of nozzle pole 70. The difference between the maximum diameter of exterior sidewall section 73 of valve seat 90 at the delivery end of valve seat 90 and the maximum diameter of delivery end sidewall 28 of nozzle pole 70 at the delivery end of nozzle pole 70 is at a minimum in order to facilitate assembly and welding.

In the embodiment shown in FIG. 2 for example, the delivery end of nozzle pole 70 is welded to the external flange 86 of valve seat 90. Desirably, the welds 112 are provided by a laser welder such as a neodymium-doped yttrium-aluminum-garnet (Nd:YAG) laser. This welding location on external flange 86 of valve seat 90 is sufficiently shielded from support land 95 and sealing land 98 of valve seat 90 so as to avoid adverse effects to sealing land 98 (such as caused by excessive upward bowing of top face 91 of valve seat 90, distortion of top face 91, and all downward bowing of top face 91) of the welding's heat stress that otherwise might cause leakage. Upward bowing of sealing land 98 should be held between one and four microns for optimum sealing between sealing land 98 of valve seat 90 and bottom surface 62 of armature 60. By distortion is meant that sealing land 98 would be so contorted that no planar line of contact would exist with bottom surface 62 of armature 60.

As shown in FIG. 3C for example, the exterior circumferential surface of nozzle pole 70 is configured with a circumferential groove 111 toward the delivery end of nozzle pole 70. As shown in FIG. 2, an external O-ring 116 can be received around this groove 111 of nozzle pole 70. O-ring 116 is retained on one end by an end lip 101 of nozzle pole 70. On the other end, O-ring 116 is retained in part by the shoulder 114 formed by the edge of injector body 42. In the fuel injector embodiment, an elastomeric seal such as O-ring 116 is used to seal injector 30 in a port of the air inlet of an engine.

As known in the art, a calibration means is provided for setting the biasing means to apply a desired biasing force so as to hold the bottom surface of the armature in sealing contact with the sealing land of the valve seat. As embodied herein, a calibration slide is disposed in the core passage 48 to provide a backstop for the biasing means such as spring 88, which applies the axial force that biases the armature 60 against the valve seat 90. In this way, the calibration slide provides a setting means, which is a means for setting the biasing means, such as the spring, to apply a desired biasing force so as to bias the bottom surface of the armature against the sealing land of the valve seat. Axial movement of the position of the calibration slide within the central passage of the core member adjusts the magnitude of the force applied by the spring to the armature. While a conventional calibration slide will suffice, as shown in FIGS. 1, 3A and 3C, a calibration slide 125 is desirably formed from an elongated tube of spring steel.

In accordance with the present invention, the hydraulic sub-assembly of the valve includes a means for filtering fluid passing through the central fluid passage of the core member. The filtering means desirably is disposed internally of the central fluid passage of the core member. The filtering means is further desirably disposed and configured to cooperate with the biasing means so as to bias the bottom surface of the armature against the sealing land of the valve seat. The filtering means is desirably disposed between the biasing means and the setting means. In further accordance with the present invention, the filtering means is configured and disposed so that it is already assembled into the valve before the calibration slide is set and by the time the valve is flow tested during setting of the calibration slide to fix the tension applied by the spring to the armature.

As embodied herein and shown in FIGS. 1, 3A and 3C, the filtering means includes an elongated filter 120 that is configured to fit within central passage 48 of core member 46. Rather than being positioned near the supply end 31 of the valve as in conventional fuel injectors, the filtering means of the present invention is desirably disposed in central passage 48 of core member 46 closer to the delivery end 32 than to the supply end 31. Moreover, filter 120 is disposed below calibration slide 125 in the sense that filter 120 is disposed closer to supply end 32 than calibration slide 125. Thus, during assembly of hydraulic sub-assembly 131, filter 120 is already in place within central passage 48 when calibration slide 125 is inserted to set the tension on spring 88. As shown in FIG. 3A for example, filter 120 is carried by an elongated holder 118 having a canted compartment 119 for holding filter 120 at an angle with respect to the central longitudinal axis 44. Holder 118 also provides a centrally disposed opening (not visible in the views shown in the Figs.) through its longitudinal axis and carries filter 120 so as to ensure that fluid must pass through filter 120 before exiting the holder's conventional opening. As shown in FIGS. 1, 3A and 3C for example, one end of holder 118 is configured with a sufficient radius and gauge to butt against a rear end of compression spring 88. The opposite end of filter holder 118 is configured to butt against one end of a calibration slide 125.

In an alternative embodiment (not shown), the relative positions of filter 120 and spring 88 could be reversed so that filter holder 118 butts against armature 60. However, in the preferred embodiment illustrated in FIGS. 1, 3A and 3C, the moving mass is minimized by being restricted to armature 60 and spring 88.

Desirably, each end of calibration slide 125 is shaped identically and so that it can be inserted into passage 48 of core member 46 without digging up shavings from the walls of central passage 48. Otherwise, such metal shavings might clog the fluid flow passages of the valve. Moreover, because filter 120 is already in place within passage 48 when calibration slide 125 is inserted, any such metal shavings caused by the insertion of the calibration slide would be caught by filter 120 rather than result in either clogging or fouling either flow passages 64 of armature 60 or conduits 87 of valve seat 90.

When the valve is flow tested during setting of the calibration slide to fix the tension applied by the spring to the armature, the filter is already installed into the valve. The presence of filter 120 during such flow testing yields a more accurate flow test than if such testing were done without the filter present. Thus, the configuration of the present invention, permits more accurate calibration of the valve than is possible with conventional valve designs.

In accordance with the present invention, the full extent of permissible movement of the armature between its resting position when disposed against the valve seat and its actuated position when disposed against the bottom surface of the lift stop member, is known as the "lift" of the armature. In the present embodiment, the "lift" is determined by a consideration of the axial height of the armature in relation to the combined heights of the guide ring and the portion of the magnetic nozzle pole that butts against the guide ring. In the embodiment shown in FIG. 2, a bottom surface 47 of lift stop member 80 is disposed against top surface 74 of magnetic nozzle pole 70. Bottom surface 75 of magnetic nozzle pole 70 is disposed to contact and rest upon a top surface 78 of guide ring 76. A bottom surface 79 of guide ring 76 is disposed to contact and rest upon support surface 97 of valve seat 90. As indicated in FIG. 2 by the distance between opposed arrows designated by the number 123, the axial thickness of armature 60 is about 50 microns less than the sum of the axial thicknesses of interior wall 71 of supply end of nozzle pole 70 and interior wall 77 of guide ring 76. Accordingly, the lift of the armature is about 50 microns and is schematically indicated in FIG. 2 by the axial distance between the parallel straight lines disposed between the opposed arrows and labeled 123.

In further accordance with the present invention, the assembly of the valve has been greatly simplified. As shown in FIGS. 2 and 6 for example, at least a first continuous weld (indicated by the row of slash lines labeled 121) is disposed to fix bottom surface 47 of lift stop member 80 to top surface 74 of nozzle pole 70. Desirably, the welding is performed with a laser welder such as a Nd:YAG welder. As shown in FIG. 2 for example, at least a second continuous weld (indicated by the row of slash lines labeled 122) (also desirably laser welds such as Nd:YAG welds) is disposed to fix a portion of interior sidewall surface 84 of lift stop member 80 to a portion of the exterior surface of core member 46. Then guide ring 76 is inserted to rest against bottom surface 75 of the supply end of magnetic nozzle pole 70. Then armature 60 is inserted to rest against bottom surface 47 of lift stop member 80.

Next, valve seat 90 is inserted. The stepped configuration of the circumferential exterior sidewall of valve seat 90 provides greater ease of assembling valve seat 90 into the receiving chamber 102 at the delivery end of nozzle pole 70. Then, Nd:YAG welds 112 are used to attach valve seat 90 to the delivery end of nozzle pole 70 and thereby hermetically seal nozzle pole 70 to valve seat 90. In this way, valve seat 90 forms the bottom boundary of the receiving compartment that houses armature 60.

In accordance with the present invention, the valve is configured to enable accurate and easy setting of the valve's air gap during assembly of the valve. The desired "air gap" is the distance between the bottom surface 56 of the core member 46 and the top surface 61 of the armature 60 when the top surface 61 of the armature rests against the bottom surface 47 of the lift stop member 80. As shown in FIG. 2, the air gap 124 is schematically indicated by the parallel straight lines disposed between the opposed arrows and labeled 124. During assembly of the hydraulic sub-assembly of the valve of the present invention, the desired air gap is set when a portion of the exterior surface of the core member 46 is welded to the interior sidewall surface 84 of the lift stop member 80. Thus, as shown in FIG. 2, the valve of the present invention includes a first plurality of welds 121 disposed to fix lift stop member 80 to top surface 74 of nozzle pole 70, and a second plurality of welds 122 is disposed to fix lift stop member 80 to the exterior surface of core member 46. The use of the welder to weld lift stop member 80 to the exterior surface of core member 46 permits direct setting of the air gap 124 defined between top surface 61 of armature 60 and bottom surface 56 of core member 46 when upper surface of armature 60 is positioned against bottom surface 87 of lift stop member 80. Moreover, the welds 121, 122 are configured and disposed to hermetically seal the valve and prevent leakage of the fluid during operation of the valve.

As known in the art, the size of this air gap 124 needs to be precisely controlled, regardless of the magnitude of the gap required by the particular valve application. In a presently preferred fuel injector embodiment, this air gap 124 is 20 microns plus or minus 6 microns. Furthermore, these welds 121, 122 are disposed in a manner whereby lift stop member 80 prevents physical contact between armature 60 and bottom surface 56 of core member 46 when core member 46, armature 60, and magnetic nozzle pole 70 are selectively actuated to form a magnetic circuit.

When the welding is completed, core member 46 becomes hermetically sealed to lift stop member 80, lift stop member 80 becomes hermetically sealed to nozzle pole 70, and nozzle pole 70 becomes hermetically sealed to valve seat 90. Thus, as shown in FIG. 3C, a first hydraulic sub-assembly 131 includes the armature 60 (not visible in this view), the core member 46, the lift stop member 80, the guide ring 76 (not visible in this view), the magnetic nozzle pole 70, and the valve seat 90 (not visible in this view), all assembled together and hermetically sealed to one another as explained above. This hydraulic sub-assembly 131 shown in FIG. 3C can be assembled as a separate unit from electrical sub-assembly 132. Moreover, in accordance with the present invention, there is no need for any internally disposed O-ring for the purpose of hydraulically sealing the valve against leakage.

In a first operative condition of the valve, fluid is prevented from flowing through the valve. In a second operative condition of the valve, fluid is permitted to flow through the valve. The electrical sub-assembly includes at least one electrical component for switching the hydraulic sub-assembly from the first operative configuration to the second operative configuration. As shown in FIG. 3B, electrical sub-assembly 132 includes valve body 42, body flange 49, coil assembly 50 (bobbin 52, wire 55, and terminal blades 57), and plastic jacket 34 covering valve body 42. Depending on whether electric current passes through wire 55 and terminal blades 57, hydraulic sub-assembly 131 may be switched from the first operative configuration of the valve to the second operative configuration of the valve.

Electrical sub-assembly 132 is completed when plastic jacket 34 is molded around coil assembly 50, body flange 49, and body 42. Electrical sub-assembly 132 is configured to receive mechanical insertion of hydraulic sub-assembly 131 into electrical sub-assembly 132. As shown in FIG. 1, this is accomplished by molding an axially extending central channel 103 in main branch 35 of plastic jacket 34. Core member 46 defines an exterior surface that is configured with the same transverse cross-section as channel 103. This complementary symmetry facilitates mechanical insertion of hydraulic sub-assembly 131 axially into channel 103 of electrical sub-assembly 132. In the embodiment shown, the exterior surface of core member 46 has both a constant cross-sectional shape along the length thereof and a constant diameter along the length thereof.

In the embodiments shown in FIGS. 1–6A, the components are configured with cylindrical symmetry having a circular transverse cross-section. However, cylindrical symmetry having a square or triangular or other polygonal transverse cross-section also could be employed. Moreover, the exterior and/or interior surfaces of these components can be provided with different transverse cross-sectional shapes along one or more portions of their lengths. Similarly, the shapes of the various openings and pathways through which fluid passes through the valve can be provided with different transverse cross-sectional shapes along one or more portions of their lengths, and thus need not be circular.

As shown in FIG. 1, when hydraulic sub-assembly 131 is inserted into channel 103 of main branch 35 of plastic jacket 34, top bushing 40 is then inserted into receiving end 31 of channel 103 of main branch 35 of plastic jacket 34 and welded to core member 46 at the location generally designated 29 to secure hydraulic sub-assembly 131 to electrical sub-assembly 132. However, before top bushing 40 is welded to core member 46, it becomes possible to orient one or more distinguishing features of hydraulic sub-assembly 131 relative to one or more distinguishing features of electrical sub-assembly 132. For example, it becomes possible to orient the auxiliary branch 36, which contains terminal blades 57, relative to the spray pattern resulting from discharge of fluid from outlet conduits 87 in valve seat 90. When the desired orientation of the desired features has been set, then top bushing 40 is welded into place to fix these relative orientations of the valve's components.

Because the valve of the present invention is configured to permit hydraulic sub-assembly 131 to be assembled separately from electrical sub-assembly 132, the valve of the present invention enjoys several advantages over conventional valves. For example, the hydraulic sub-assembly 131 is not subjected to the heat stresses and pressure stresses that occur when plastic jacket 34 is molded around supply end 38 of the valve's body 42. Moreover, the separately sealed hydraulic sub-assembly 131 can be independently checked for leakage, static flow rate, and armature lift before being combined with the electrical sub-assembly 132.

The manufacture of a presently preferred embodiment of the valve of the present invention can be accomplished with very few machining operations. This is possible because core member 46 and body 42 can be cut from a piece of tubing. Moreover, both lift stop member 80 and guide ring 76 can be formed of a fine blanked component. Furthermore, armature 60 can be molded. A small amount of secondary machining is required to finish outer surfaces 61, 62 and 63 of armature 60. Body flange 49 can be formed of a fine blanked component or a powdered metal component.

In the closed position of the valve shown in FIG. 2, bottom surface 62 of armature 60 rests against upper surface 99 of sealing land 98 and support surface 97 of support land 95. In the open position of the valve, when electric current is supplied to coil 50, core member 46 becomes an electromagnet and forms the single working pole of a magnetic circuit in which bottom surface 56 of core member 46 assumes opposite magnetic polarity to top surface 61 of armature 60. The magnetic flux travels through core member 46, armature 60, and magnetic nozzle pole 70. When this happens, armature 60 will be lifted from support land 95 and sealing land 98 and armature 60 will move vertically toward spring 88, until top surface 61 of armature 60 rests against bottom surface 47 of lift stop member 80 to form air gap 124 therebetween. With the armature magnetically held in this position, the central fluid passage 48 of core member 46 communicates with plenum 66 and passages 64 of armature 60, so that when the armature is lifted from the lands 95, 98, fluid can flow down the central passage 48 of core member 46, into the plenum 66 of the armature 60 and through the passages 64 of the armature and to interior surface 94 of top face 91 of valve seat 90. From there the fluid passes through entrance openings 85 and outlet conduits 87 of the valve seat 90. In the injector embodiment, the fuel issuing from the conduits 87 through exit openings 89 is atomized and flows through the valve seat 90 into an air inlet duct of the associated engine.

What is claimed is:

1. An electromagnetically actuatable disc-type valve for metering the supply of fluid, the valve comprising:

an elongated cylindrical core member having an exterior surface including a bottom surface, said core member defining a hollow passage internally thereof;

an armature having a top surface disposed toward said bottom surface of said core member, said armature having a bottom surface disposed to face opposite said top surface of said armature;

a lift stop member formed of non-magnetic material, said lift stop member being configured in the form of a first annular sleeve with an axial opening configured to receive a portion of said core member therein;

a valve seat configured in the form of a first disc having a top face disposed toward said bottom surface of said armature, said top face including a top surface, said valve seat defining at least one entrance opening through said top surface, said valve seat defining at least one sealing land surrounding all said entrance openings and having an upper surface raised above said top surface of said valve seat;

a nozzle pole configured in the form of a second annular sleeve, said nozzle pole defining a supply end and a delivery end disposed axially opposite said supply end, said nozzle pole defining an interior wall at said supply end, at least part of said interior wall defining at least part of a first receiving compartment, said armature being at least partially received within said first receiving compartment;

each of said core member, armature and nozzle pole being formed of magnetic material and configured and disposed together to be selectively actuated to form part of a magnetic circuit with a single working pole at said bottom surface of said core member;

a guide ring formed of non-magnetic material and configured in the form of a third annular sleeve, said guide ring being disposed to prevent physical contact between said armature and said nozzle pole when said core member, said armature and said nozzle pole are selectively actuated to form part of said magnetic circuit;

a first weld for welding said nozzle pole to said lift stop member; and a second weld for welding said lift stop member to a portion of said exterior surface of said core member in a manner defining an air gap of a predetermined magnitude between said top surface of said armature and said bottom surface of said core member when said core member, said armature, and said nozzle pole are selectively actuated to form part of said magnetic circuit.

2. An apparatus as in claim 1, further comprising a third weld for welding said nozzle pole to said valve seat at a location of said valve seat sufficiently shielded from said sealing land of said valve seat so as to prevent downward bowing of said sealing land of said valve seat.

3. An apparatus as in claim 1, further comprising a third weld for welding said nozzle pole to said valve seat at a location of said valve seat sufficiently shielded from said sealing land of said valve seat so as to prevent excessive upward bowing of said sealing land of said valve seat.

4. An apparatus as in claim 1, further comprising a third weld for welding said nozzle pole to said valve seat at a location of said valve seat sufficiently shielded from said sealing land of said valve seat so as to prevent excessive distortion of said sealing land of said valve seat.

5. An apparatus as in claim 1, further comprising a third weld for welding said nozzle pole to said valve seat, and wherein said first, second, and third welds being configured and disposed to hermetically seal the valve and prevent leakage of fluid during operation of the valve, and wherein:
said nozzle pole defining a delivery end interior sidewall at said delivery end of said nozzle pole, at least part of said delivery end interior sidewall defining a receiving chamber, said valve seat being received within said receiving chamber, said nozzle pole defining an intermediate interior sidewall between said supply end and said delivery end of said nozzle pole, said intermediate interior sidewall defining an intermediate internal compartment, said guide ring being received within said intermediate internal compartment.

6. An apparatus as in claim 1, wherein:
said exterior surface of said core member is configured as a right cylinder with a circular transverse cross-section, and said hollow passage of said core member is configured as a right cylinder with a circular transverse cross-section.

7. An apparatus as in claim 1, further comprising:
a means for biasing said bottom surface of said armature against said sealing land of said valve seat, said biasing means being at least partly disposed internally of said passage of said core member; and
a means for filtering fluid passing through said passage of said core member, said filtering means being disposed internally of said passage of said core member and further disposed and configured to cooperate with said biasing means to bias said bottom surface of said armature against said sealing land of said valve seat.

8. An apparatus as in claim 7, further comprising a means for setting said biasing means to apply a desired biasing force to bias said bottom surface of said armature against said sealing land of said valve seat, said filtering means being disposed between said biasing means and said setting means.

9. An apparatus as in claim 1, wherein said valve seat defines a supply end and a delivery end disposed axially opposite said supply end, said supply end of said valve seat further defining an axially extending exterior surface defined by a first diameter, said delivery end of said valve seat further defining a generally axially extending exterior surface that is diverging to a second diameter larger than said first diameter of said supply end, said nozzle pole being welded to a portion of said diverging exterior surface of said delivery end of said valve seat.

10. An apparatus as in claim 1, wherein said armature is configured in the form of a disc having a cylindrically-shaped outer side surface defined by an exterior diameter;
said guide ring having a top surface and a bottom surface opposed to said top surface of said guide ring, said guide ring having a cylindrically-shaped interior side surface forming a central opening defined by an interior wall having an axial length extending from said top surface to said bottom surface of said guide ring; and
said axial length of said guide ring being configured in relation to said exterior diameter of said armature, the amount of lift permitted said armature between said lift stop member and said top surface of said armature, and the diametrical clearance between the central opening of said guide ring and said cylindrically-shaped outer side surface of said armature, so as to preclude jamming of said armature.

11. An electromagnetically actuatable disc-type valve for metering the supply of fluid, the valve comprising:
an elongated cylindrical core member having an exterior surface including a bottom surface, said core member defining a hollow passage internally thereof;
an armature having a top surface disposed toward said bottom surface of said core member, said armature having a bottom surface disposed to face opposite said top surface;
a valve seat having a top face disposed toward said bottom surface of said armature, said valve seat defining at least one entrance opening through said top face, said valve seat defining at least one sealing land surrounding said at least one entrance opening;
a means for resiliently biasing said armature against said sealing land of said valve seat, said biasing means having a forward end and a rear end opposite said forward end, said valve seat being disposed closer to said forward end of said biasing means than to said rear end of said biasing means;
a means for filtering fluid passing through said passage of said core member, said filtering means being disposed internally of said passage of said core member, said biasing means being disposed between said armature and said filtering means; and
a calibration means for setting the biasing force on said armature via said filtering means and said biasing means, said filtering means being disposed between said biasing means and said calibration means.

12. An electromagnetically actuatable disc-type valve for metering the supply of fluid, the valve comprising:
a hydraulic sub-assembly, said hydraulic sub-assembly having a supply end for receiving fluid, said hydraulic sub-assembly having a delivery end disposed opposite said supply end, said delivery end being configured for delivering fluid supplied to said supply end, said hydraulic sub-assembly including an elongated core member extending between said supply end and said delivery end of said hydraulic sub-assembly and defining an internal passage for the fluid passing through the valve, said hydraulic sub-assembly further including an armature with a top surface disposed toward said delivery end of said core member, said armature defining a fluid passage axially through said armature for selective communication with said internal passage of said core member, said hydraulic sub-assembly being configured to selectively define in a first operative configuration a path for the flow of fluid therethrough and in a second operative configuration being sealed against the flow of fluid through said path; and
an electrical sub-assembly, said electrical sub-assembly including at least one electrical component for switching said hydraulic sub-assembly from said first operative configuration to said second operative configuration, said electrical sub-assembly being configured to receive mechanical insertion of said hydraulic sub-assembly into said electrical sub-assembly, wherein said core member defining an exterior surface that is configured to facilitate mechanical insertion of said hydraulic sub-assembly into said electrical sub-assembly.

13. An apparatus as in claim 12, wherein said core member defining an exterior surface with a constant cross-sectional shape along the length thereof to facilitate mechanical insertion of said hydraulic sub-assembly into said electrical sub-assembly.

14. An apparatus as in claim 12, wherein said core member defining an exterior surface with a constant diameter along the length thereof to facilitate mechanical insertion of said hydraulic sub-assembly into said electrical sub-assembly.

15. An apparatus as in claim 12, wherein:

said electrical sub-assembly includes an elongated cylindrical body having an exterior surface and an interior surface, said exterior surface of said body being configured as a right cylinder with a circular transverse cross-section, and said interior surface of said body being configured as a right cylinder with a circular transverse cross-section.

16. An apparatus as in claim 12, wherein:

said electrical sub-assembly includes an elongated cylindrical body, said body defining an elongated channel internally along the length of said body, said body having a first end and a second end disposed opposite said first end, said first end being configured to receive at least a portion of said delivery end of said hydraulic sub-assembly within said first end of said body, said body having an outside diameter of no more than 13.5 mm where said first end of said body is configured to receive at least a portion of said delivery end of said hydraulic sub-assembly within said first end of said body.

17. An apparatus as in claim 12, further comprising a top bushing disposed between said hydraulic sub-assembly and said electrical sub-assembly at said supply end of said hydraulic sub-assembly, said top bushing being inserted into said electrical sub-assembly and welded to said hydraulic sub-assembly so as to connect said hydraulic sub-assembly to said electrical sub-assembly.

\* \* \* \* \*